United States Patent [19]

Dunlap

[11] 4,172,048

[45] Oct. 23, 1979

[54] MIXTURE SUITABLE FOR AN AEROSTAT

[75] Inventor: Richard M. Dunlap, Middletown, R.I.

[73] Assignee: The United States of America as represented by the Secretary of the Navy, Washington, D.C.

[21] Appl. No.: 947,810

[22] Filed: Oct. 2, 1978

[51] Int. Cl.$^2$ ............................ C09K 3/00; B64B 1/40
[52] U.S. Cl. .................................. 252/372; 244/31; 244/97; 244/98; 9/314; 9/316
[58] Field of Search ................. 252/372; 244/31, 97, 244/98; 9/314, 316

[56] References Cited

U.S. PATENT DOCUMENTS 3,412,963   11/1968   Struble .............................. 244/146

OTHER PUBLICATIONS

Ishida, Bull. Chem. Soc., Japan, 31 (1958), pp. 143–148.

*Primary Examiner*—Howard T. Mars
*Attorney, Agent, or Firm*—Richard S. Sciascia; Arthur A. McGill; Prithvi C. Lall

[57] ABSTRACT

A balloon filled with a gas mixture of ammonia and n-hexane will stay at a constant altitude due to condensation at altitude of the n-hexane. Since both components are liquid below about 50 meters in the ocean and together with the load are buoyant, the aerostat may be submarine launched and rise to the surface at which point the ammonia and n-hexane evaporate and take the balloon and load to its preset altitude.

3 Claims, 2 Drawing Figures

MIXTURE SUITABLE FOR AN AEROSTAT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to a gas mixture for use in an aerostat. More particularly the gas mixture utilizes two substances one of which condenses at an altitude to reduce the weight of the air displaced causing the aerostat to float at a constant altitude.

Present aerostat technology dictates the use of bottled helium and a strong envelope so that the balloon would have constant volume and would support considerable super pressure at the hovering altitude.

SUMMARY OF THE INVENTION

It is therefore a general object of the invention to disclose an improved mixture of gases for use in an aerostat. It is an additional object that an aerostat containing the mixture of gases be particularly suitable for underwater launch from a submarine.

This is accomplished in accordance with the present invention by providing a mixture of gases in which both the gases, n-hexane and ammonia are suitable to be launched underwater in the liquid state and to assume the gaseous state upon surfacing in the water. This would enable an unmanned aerostat to carry many kinds of instrumentation.

DESCRIPTION OF THE PREFERRED EMBODIMENT

Figure 1:
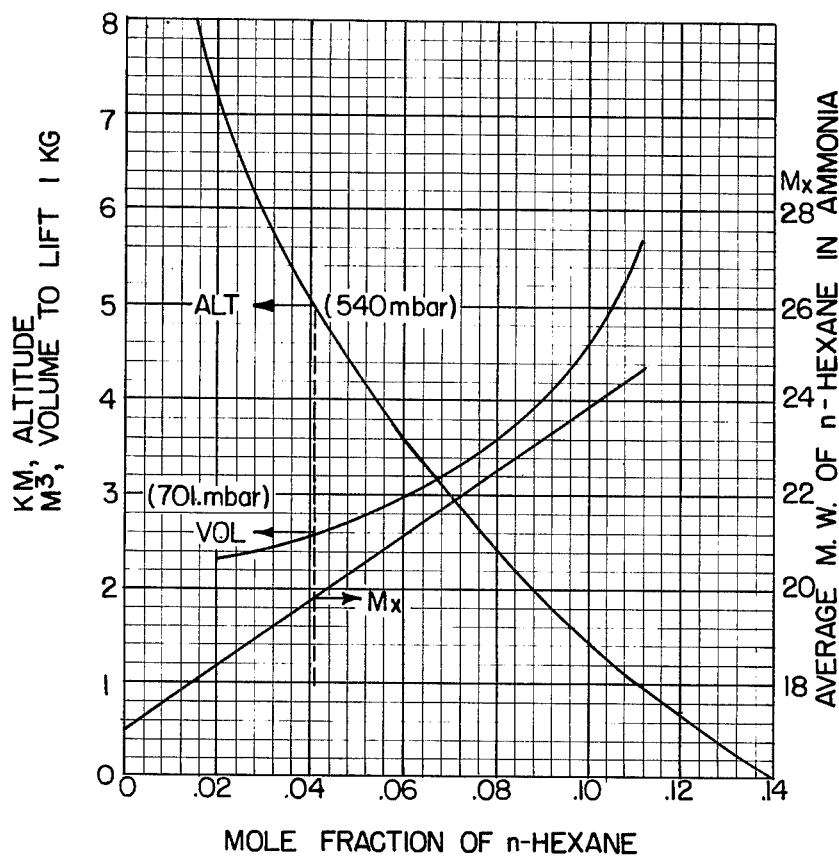
FIG. 1 is a graph of altitude vs. mole fraction of n-hexane in ammonia to lift 1 kilogram.

An aerostat may be filled with a mixture of two components, one of which condenses at a predetermined altitude to reduce the weight of air displaced and thereby float at a constant altitude. It is required that the condensing component at its partial pressure in the mixture condense at the temperature corresponding to the desired altitude. Thus, for an aerostat to float at 5 km in the U.S. Standard Atmosphere (1962) the temperature is $-17°$ C. and the pressure is 540 mbars, the condensing gas should be saturated.

In Table 1 below several hydrocarbons are shown. Both ammonia and helium are shown as lifting gases since neither reacts with the hydrocarbons. Ammonia and hydrocarbons are both reducing agents, and helium is inert. Since the aerostat may be submarine launched, ammonia is preferred. Ammonia becomes liquid at shallow ocean depths of about 55 meters, making for convenient packaging. The important results tabulated in Table 1 include the volume of the gas mixture, V in cubic meters; the takeoff load, $L_0$ in kilograms; the buoyancy margin, B; the average molecular weight of the binary gas, $M_x$; and the lifting load with the substance condensed, $L_1$ in kilograms. Of the candidates listed n-hexane combined with ammonia appears to be the best. It has adequate buoyancy margin in a reasonable size.

The data for helium instead of ammonia as the lifting gas shows cyclopentane to be the best substance. This mixture will not condense at any ocean depth and is not particularly suitable for submarine launch. It is, however, a very safe mixture.

Table 2 below shows the altitude, temperature, pressure and density of the U.S. Standard Atmosphere (1962). For each temperature is computed the saturation pressure of n-hexane. Each saturation pressure has been divided by the corresponding atmospheric pressure to yield the mole fraction of n-hexane which would result in saturation at that temperature and pressure. Also computed and tabulated are the molecular weight of the mixture, $M_x$; and the volume of mixture required to lift one kilogram at sea level, V. The essential results are plotted in FIG. 1. Stable altitudes between 1.5 and 6 km can be obtained by varying the proportions of n-hexane and ammonia.

TABLE 1

| Substance | Formula | $M_s$ Mole wt | Partial pressure at $-17°$ C. when saturated psia/molar | Mole Fraction of substance | Lifting Gas | Avg. M.W. | V m$^3$ | $L_1$ kg | $L_0$ kg | B |
|---|---|---|---|---|---|---|---|---|---|---|
| n-hexane | C$_6$H$_{14}$ | 86.17 | .32/22.1 | .0409 | Ammonia | 19.858 | 2.595 | .870 | .935 | .070 |
|  |  |  |  |  | Helium | 7.36 | 1.09 | .941 | .971 | .030 |
| 2,3 dimethyl butane | C$_6$H$_{14}$ | 86.17 | .6/41.4 | .0767 | Ammonia | 22.333 | 3.563 | .665 | .833 | .201 |
|  |  |  |  |  | Helium | 10.30 | 1.27 | .883 | .942 | .062 |
| cyclopentane | C$_5$H$_{10}$ | 70.13 | .82/56.5 | .1046 | Ammonia | 22.584 | 3.703 | .525 | .763 | .237 |
|  |  |  |  |  | Helium | 10.917 | 1.31 | .832 | .916 | .084 |
| n-pentane | C$_5$H$_{12}$ | 72.15 | 1.5/103.4 | .1915 | Ammonia | 27.585 | 17.081 | −3.007 | −1.003 |  |
|  |  |  |  |  | Helium | 17.05 | 1.98 | .534 | .767 | .304 |

TABLE 2

U.S. STANDARD ATMOSPHERE

| Alt. km | °K. | Temp. °C. | Press. mbar | Density kg/m$^3$ | Psat n-hexane mbar | Saturated C$_6$H$_{14}$ Mole Fraction | C$_6$H$_{14}$ and NH$_3$ $M_x$ | v m$^3$ |
|---|---|---|---|---|---|---|---|---|
| 0 | 288.1 | 15 | 1013. | 1.225 | 141.1 | .139 | 26.66 | 10.23 |
| 1 | 281.6 | 8.5 | 899. | 1.112 | 100.6 | .112 | 24.77 | 5.625 |
| 2 | 275.1 | 2.0 | 795. | 1.007 | 70.5 | .089 | 23.16 | 4.07 |
| 3 | 268.7 | −4.5 | 701. | 9.092 | 48.6 | .069 | 21.83 | 3.31 |

TABLE 2-continued
U.S. STANDARD ATMOSPHERE

| Alt. km | °K. | Temp. °C. | Press. mbar | Density kg/m³ | Psat n-hexane mbar | Saturated C$_6$H$_{14}$ Mole Fraction | C$_6$H$_{14}$ and NH$_3$ M$_x$ | v m³ |
|---|---|---|---|---|---|---|---|---|
| 4 | 262.2 | −11.0 | 617. | 8.194 | 32.9 | .053 | 20.72 | 2.87 |
| 5 | 255.7 | −17.5 | 540. | 7.364 | 21.87 | .040 | 19.83 | 2.59 |
| 6 | 249.2 | −24.0 | 472. | 6.601 | 14.22 | .030 | 19.11 | 2.40 |
| 7 | 242.7 | −30.5 | 411. | 5.900 | 9.03 | .022 | 18.55 | 2.27 |
| 8 | 236.2 | −36.9 | 357. | 5.258 | 5.60 | 0.0157 | 18.12 | 2.18 |

The following calculations are for determining the essential characteristics of binary gases in a constant altitude aerostat:

$$M\,W_{avg} = M_x = M_L(1-x) + M_s x$$

where $M\,W_{avg} = M_x$ = average molecular weight of combined lifting gas and substance
$M_L$ = molecular weight of lifting gas
$M_s$ = molecular weight of substance
$x$ = mole fraction of substance when combined with lifting gas.

To lift load L with both the lifting gas and the substance vaporized $$V = \frac{L}{d_A}\left(1 - \frac{M_x}{M_A}\right)$$

where $d_A$ = density of the atmosphere
$M_A$ = molecular weight of atmosphere

With the substance condensed to a negligible volume and the lifting gas as gaseous form, we can lift a lesser load, L, $$L_1 = V d_A\left(1 - x - \frac{M_x}{M_A}\right)$$

So that the buoyancy margin is the fraction $$B = \pm\left(\frac{L - L_1}{L + L_1}\right)$$

depending on the state of the condensing substance
$P_{mbar} = 68.95\,P_{sia}$
$x = (P_{mbar}/540)$
$M_L$ = M.W.
For H$_e$, M.W. = 4.00
For NH$_3$, M.W. = 17.03

Line of sight range to horizon from altitude $H(km) = 113\sqrt{H}$

For zero buoyance in water using the n-hexane-ammonia composition, the following relationship must hold:

$$\frac{xM_s + (1-x)M_N + L_o \frac{\text{mole vol}}{V}}{d_w\left[\frac{xM_s}{d_s} + \frac{(1-x)M_N}{d_N} + \frac{L_o}{d_L}\right]\frac{MV}{V}} \leq 1$$

When the expression is unity $d_L$ (max) is determined.
$d_L$ (max) = 4.36 gm/cm³ (sp.gr. = 4.25), payload density
Where mole vol = 22.414 m³/kg
$d_s$ = density liquid n-hexane = 0.6603
$d_N$ = density liquid ammonia = 0.817
Envelope capacity should be $$V \frac{d_{sea\,level\,air}}{d_{5\,Km\,air}} = (2.595)\frac{1.225}{.736} = 4.31 m^3$$

to avoid burst at 5 km altitude. Solar heating will raise the internal temperature and raise the altitude of the aerostat.

Properties
C$_6$H$_{14}$ B.P. = 68.95° C.

| Temp range, t | A | B |
|---|---|---|
| −50 to −10° C. | 35167 | 8.399 |
| −10 to +90° C. | 31679 | 7.724 | where $$\log_{10} P_{mm}\,Hg = -\frac{.05223}{T°K}A + B$$

and $P_{mbar} = 1.3332\,P_{mm}\,Hg$
P is the saturation pressure at temperature $T = t + 273$
A and B are constants in the Antoine equation
So that $$P_{mbar} = 1.3332\,10^{\frac{-.05223}{t+273}A + B}$$

| t °C. | P$_{mbar}$ | Total pressure when mole fraction = .0408 |
|---|---|---|
| −50 | 1.94 | 47.5 |
| −40 | 4.37 | 107. |
| −30 | 9.23 | 226. |
| −20 | 18.36 | 449.6 |
| −17.2 | 22.05 | 540. |
| −10 | 34.67 | 849.09 |
| 0 | 61.39 | 1502. |
| +10 | 100.52 | 2463. |

Figure 2:
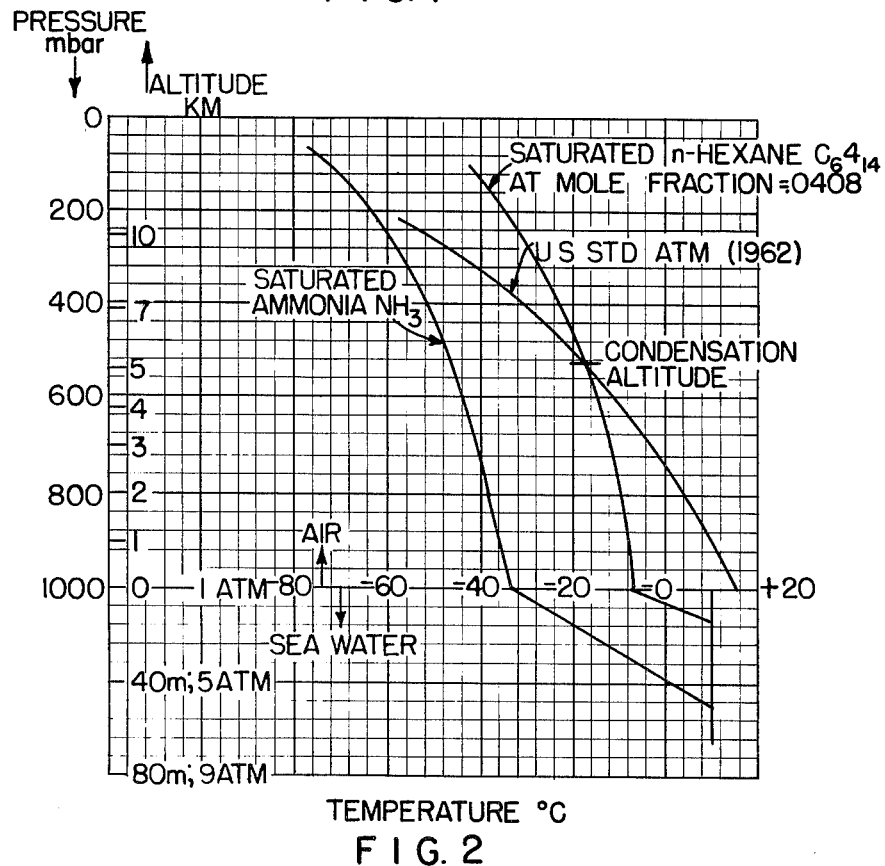
FIG. 2 is a pressure-temperature graph comparing saturated n-hexane and ammonia to standard atmospheric conditions over a range of altitudes.

This data is plotted in FIG. 2.
For NH$_3$ B.P. = −33.35° C.
P$_{sat}$ vs t° C. is given below

| t° C. | P$_{mm}$Hg | P$_{mbar}$ | |
|---|---|---|---|
| −77 | 47.8 | 63.7 | |
| −62 | 143.8 | 191.7 | |
| −50 | 307. | 409.3 | |
| −41 | 510.3 | 680.3 | |
| −35 | 699.1 | 932.0 | |
| −20 | 1427. | 1902. | (= 8.8 meters) |
| +10 | 4612. | 6149. | (= 50.7 m) |

This data is plotted in FIG. 2.

Proportions of mixture

For mole fraction, x, hexane=0.0408 and mole fraction (1=x) ammonia=0.9592 vol liquid 0.0408 moles hexane $V_H = x\ M_{hex}/d_{hex}$ $V_H = M_{hex}/d_{hex} = 5.32$ ml vol gas ammonia 22.4 liters×0.9592=21.49 liters which will lift $$V\ d_{air}\left(1 - \frac{M_{mix}}{M_{air}}\right)$$

$$= 21.49\ 1.229\ \text{g/liter}\left(1 - \frac{19.85}{28.97}\right) = 8.29\ \text{grams}$$

$$\frac{5.32\ \text{ml}}{8.29\ \text{grams}} = \frac{.64\ \text{m. hexane}}{\text{gram lift of ammonia}}$$

Therefore, add 0.64 ml of hexane for each gram lift from pure ammonia. Adding more will reduce the hovering altitude as shown in FIG. 1

The described mixture is suitable for use in a aerostat enabling the aerostat to raise a communication buoy from a submarine, transport meteorological instruments and radar false targets.

It will be understood that various changes in details, materials, steps and arrangement of parts, which have been herein described and illustrated in order to explain the nature of the invention, may be made by those skilled in the art within the principle and scope of the invention as expressed in the appended claims.

What is claimed is:

1. A gaseous mixture for use in an aerostat consisting essentially of n-hexane and ammonia wherein the mole fraction of n-hexane is between 0.0157 and 0.139, and the balance is ammonia.

2. A gaseous mixture for use in an aerostat consisting essentially of n-hexane and ammonia wherein the mole fraction of n-hexane is between 0.030 and 0.101, and the balance is ammonia.

3. A gaseous mixture for use in an aerostat consisting essentially of n-hexane and ammonia wherein the mole fraction of n-hexane is between 0.030 and 0.053, and the balance is ammonia.

* * * * *